Patented Aug. 13, 1940

2,211,558

UNITED STATES PATENT OFFICE 2,211,558

LUBRICATING OIL AND LUBRICATION THEREWITH

Philip Gordon Colin, Staten Island, N. Y., and Arthur Walther Lewis, Elizabeth, N. J., assignors to Tide Water Associated Oil Company, Bayonne, N. J., a corporation of Delaware No Drawing. Application September 25, 1937, Serial No. 165,683

5 Claims. (Cl. 252—44)

This invention relates to lubricants intended for service in the lubrication of internal combustion engines. The invention more particularly is concerned with lubricating or motor oils of mineral hydrocarbon origin which are normally corrosive toward bearing metal alloys of the character of cadmium-silver, cadmium-nickel or copper-lead, as well as those bearing metals of exceptionally high lead content (of the order of 75% to 99%) wherein minor proportions of alloying metals impart unusual hardness to the alloy; and has, for an important objective, the inhibition or prevention of deterioration of such bearing metal in service by the corrosive action of the lubricant thereon.

Engine bearings comprising or surfaced with cadmium-silver, "high-lead" or like alloys now are frequently employed in lieu of the more usual Babbitt metal bearings, in order to cope with extreme service conditions of friction and temperature. These conditions are the consequences of modern developments in internal combustion engines making available high sustained speeds and requiring bearings formed of metals or alloys having greater resistance to wear, and further characterized by higher melting points necessary to prolonged life under the extreme thermal conditions existing during operation of the engine. Temperatures at the bearing surfaces during operation are, or may be, much higher in the case of engines requiring these new bearings than formerly was the circumstance with engines in which Babbitt metal bearings gave satisfactory service.

Experience with bearings of the character or type exemplified by cadmium-silver, cadium-nickel, copper-lead and "high-lead" alloys has demonstrated, however, that their utility is greatly impaired by an extreme susceptibility to rapid deterioration by the corrosive action or effect of many available lubricating oils. Particularly has this effect been noted when the oils are of the character generally regarded as superior lubricants by conventional criteria.

Little is known concerning the nature of the corrosive action or its causes; but in general it has been observed that motor oils derived from selected crudes predominantly paraffinic in origin, as well as those oils from these or other crudes which have been improved by treatment with selective solvents, exhibit a marked tendency toward corrosion of the bearings in question, although by other tokens the lubricant is of superior quality. It is possible that the high bearing surface temperatures existing under service conditions with the new bearings may be a factor in occasioning the observed deleterious effect of motor oils thereupon. It would appear, also, that the problem of bearing corrosion, with which the present invention is particularly concerned, contrasts with problems of lubricant deterioration per se, since oils characterized by long life and good stability in conventional tests may, and frequently do, prove to be the most corrosive in bearing corrosion tests. No theory in explanation of the observed corrosive action or the prevention thereof, as herein proposed according to the invention, is intended to be relied upon.

According to the present invention, it has now been found that the corrosive effect of lubricating oils upon bearing surfaces of the character referred to above may be avoided in novel and effective manner by incorporating with such oils particular compounds having a retarding or inhibiting effect in respect of such corrosion. More specifically, the invention arises from the discovery that a compound comprising tin tetra phenyl effects a very beneficial retardation of the corrosive action of internal combustion engine lubricating oils upon cadmium-silver, cadmium-nickel, copper-lead, "high-lead" and like bearing metal alloys.

It is, therefore, an important object of the present invention to inhibit or retard the corrosive deterioration of these and like bearing metal alloys in automotive service by providing a lubricant therefor comprising a refined mineral hydrocarbon oil having incorporated therewith tin tetra phenyl in small but effective proportion. Likewise, it is an object of the invention to improve, and to prepare improved, motor oils of petroleum origin by incorporating therein tin tetra phenyl in corrosion inhibiting proportions. The provision of an inhibitor effective for such purpose and comprising a compound as aforementioned naturally is a major objective.

Viewed in another aspect, the invention may be regarded as encompassing a novel method of lubricating bearing metal surfaces, of the character of cadmium-silver, cadmium-nickel, copper-lead, "high-lead" or like alloys, by applying thereto a film of lubricant comprising mineral hydrocarbon oil having incorporated therewith a small but effective proportion of tin tetra phenyl. With this method of lubrication it has been found that prolonged life and consequent improved service may be attained in the use of these alloys as bearing metals of internal combustion engines, particularly when operating conditions such as high sustained speeds under load occasion unusually high bearing surface temperatures. The oil selected for use, in applying the lubricating method of the invention to its intended service, will be of a character generally regarded as of superior grade and refining, and of the low sludge forming of relatively sludge-resistant type as evaluated by conventional tests such as the Indiana oxidation test. Thus, the invention finds particular utility in making possible the beneficial use of such oils by avoiding deleterious consequences otherwise encountered when no preventive measures are taken against the corrosive deterioration of bearing metal alloys as hereinbefore referred to.

Tin tetra phenyl is an aromatic tin compound conforming to the structural formula

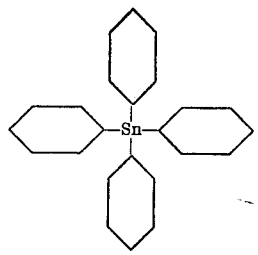

Solubility in mineral hydrocarbon oils of motor oil character is limited and varies somewhat with temperature, but the proportion necessary to accomplish the objects of the present invention is well within the limits of solubility under conditions of operation in internal combustion engines. For motor oil of S. A. E. 20 grade at ordinary temperatures (i. e., 70° F.–80° F.) about 0.15% by weight of tin tetra phenyl will dissolve with moderate application of heat to facilitate solution. At zero temperatures and below the solubility is quite some lower. Retarding of bearing corrosion according to the invention is effected, however, with proportions as low as of the order of 0.05% by weight of tin tetra phenyl dissolved in motor oil normally corrosive to bearing metals of the type comprising cadmium-silver and like alloys.

The tendency of motor oils to corrode bearings of the character in question may be determined by a convenient test which affords a ready method of obtaining a comparative evaluation of motor oils in the laboratory. In this test method a group of bearings, ordinarily including at least one each of several of the newer bearing metal alloys (viz: cadmium-silver, cadmium-nickel and copper-lead) is supported in a chamber in which air may circulate and the bearing surfaces are exposed for a period of 22 hours to a stream of oil sprayed under pressure continuously upon the corrodible area. The oil is maintained at a temperature of approximately 335° F. and the spray is so directed as to disperse the oil over the surfaces of the bearings. Means are provided for re-circulating the sprayed oil so that a given quantity is used for a given test, thus simulating service conditions in an engine. The measure of corrosion is taken as the loss in weight of the bearing per unit of exposed corrodible surface.

The test method described above is carried out in the familiar Underwood corrosion apparatus supplied by the Scientific Instrument Company of Detroit, Michigan, in accordance with General Motors specifications.

Results obtained utilizing the foregoing test for comparative evaluation of motor oils with and without an inhibitor according to the invention provide specific illustration of the value and inhibiting effectiveness of tin tetra phenyl. The oil used for the test was an S. A. E. 20 motor oil comprising a blend of well refined paraffinic base stocks and having an A. P. I. gravity of 30.1, Saybolt viscosity @ 100° F. of about 300 seconds, Saybolt viscosity @ 210° F. of 54 seconds and flash point of 425° F. The oil was of a character generally regarded as low sludge forming or relatively sludge-resistant when evaluated by conventional tests such as the Indiana oxidation test. Inhibitor, when added, was used in the indicated amount by weight based on the oil. During each run cadmium-silver, cadmium-nickel and copper-lead bearings all were present; and comparative losses in weight per square decimeter due to corrosion were observed as follows for the respective bearings:

*Experiment I*

| Bearing | Oil blank | Oil plus 0.15% tin tetra phenyl |
|---|---|---|
| | Grams | |
| Cadmium-silver | 10.3 | No loss. |
| Cadmium-nickel | 9.2 | Do. |
| Copper-lead | 5.5 | Do. |

*Experiment II*

| Bearing | Oil blank | Oil plus 0.05% tin tetra phenyl |
|---|---|---|
| | Grams | |
| Cadmium-silver | 10.3 | No loss. |
| Cadmium-nickel | 10.3 | Do. |
| Copper-lead | 5.3 | Do. |

*Experiment III*

| Bearing | Oil blank | Oil plus 0.02% tin tetra phenyl |
|---|---|---|
| | Grams | Grams |
| Cadmium-silver | 11.5 | 11.4 |
| Cadmium-nickel | 10.6 | 12.7 |
| Copper-lead | 1.1 | 1.0 |

Results in the above reported experiments clearly demonstrate the effectiveness of tin tetra phenyl as an inhibitor of bearing corrosion according to the invention. Proportions as low as of the order of 0.05% have the desired effect of completely suppressing the corrosion of cadmium-silver, cadmium-nickel, copper-lead and like bearings in the Underwood test. It will be observed, however, that when the proportion of added tin tetra phenyl is reduced to about 0.02%, the compound no longer exhibits an inhibitive action or effectiveness in respect of bearing corrosion. In the commercial application of the invention probably it will be desirable to use proportions of inhibitor up to the limit of solubility for the particular oil in service in order to provide a factor of safety. For the oil used in the foregoing experiments this limit of solubility appears to be about 0.15%, the amount added in Experiment I supra. Proportions of inhibitor within the contemplated scope and practice of the invention, therefore, range from about 0.02% to an upper limit determined by the solubility of tin tetra phenyl in a particular motor oil being used. It will be understood, of course, that the solubility of this compound probably will vary somewhat from the 0.15% reported above depending upon such factors as the viscosity and other properties of motor oil. As a general proposition, the inhibitor may be, and is intended to be, employed according to the invention in any corrosion inhibiting proportion.

Actual operation of an internal combustion engine lubricated according to the invention amply confirmed the foregoing laboratory demonstration of the efficacy of tin tetra phenyl as an inhibitor of bearing corrosion. The tests were run in an eight cylinder automobile engine equipped with connecting-rod bearings of the newer type exemplified by the alloys mentioned above; and operated under carefully controlled conditions duplicated in successive runs with and without inhibitor present in the lubricating oil. New bearings carefully weighed were used for each run, and each set comprised alternate cadmium-silver and copper-lead bearings respectively. Operating conditions included an engine speed of 2850 R. P. M. under a load of 50 brake horsepower and a running period of 15 hours, this being the equivalent of 768 miles travel at a speed of 51.2 miles per hour. Crankcase oil temperature was maintained at 300° F. and water temperature at 200° F. The oil consequently was subjected to lubricating service far more severe than that normally to be encountered in ordinary automotive use. At the end of each run the bearings were removed and again weighed, the loss in weight giving a measure of corrosion caused by the lubricant.

Tested in an engine under the foregoing conditions the oil previously described in connection with the reported Underwood tests gave the following results:

| Inhibitor | Milligrams loss in weight per bearing | |
|---|---|---|
| | Cd-Ag | Cu-Pb |
| None | 2971 | 154 |
| 0.15% tin tetra phenyl | 13 | 72 |

The foregoing results obtained in exploratory practice of the invention under service conditions of accentuated severity clearly evidence the operative significance of tin tetra phenyl as a valuable addition to motor oils intended for service in the lubrication of engines equipped with cadmium-silver and like alloy bearings.

We claim:

1. The method of lubricating bearings having substantially the corrosion susceptibility characterizing cadmium-silver, cadmium-nickel and copper-lead alloys, which consists in applying to the bearing surfaces lubricant comprising mineral hydrocarbon oil normally tending to corrode said surfaces and having incorporated therein corrosion inhibiting proportions of tin tetra phenyl.

2. The method of lubricating bearing surfaces in internal combustion engines, which bearing surfaces comprise an alloy having substantially the corrosion susceptibility characterizing cadmium-silver, cadmium-nickel and copper-lead alloys, which consists in applying to said bearing surfaces lubricant comprising mineral hydrocarbon oil normally tending to corrode said surfaces and having incorporated therein corrosion inhibiting proportions of tin tetra phenyl.

3. In the lubrication of bearing surfaces, at least one of which is formed of an alloy having substantially the corrosion susceptibility characterizing cadmium-silver, cadmium-nickel and copper-lead alloys, with mineral hydrocarbon oil normally tending to cause substantial and rapid corrosion thereof, the method of inhibiting such corrosion, which comprises incorporating with said oil corrosion inhibiting proportions of tin tetra phenyl.

4. The method of lubricating bearings having substantially the corrosion susceptibility characterizing cadmium-silver, cadmium-nickel and copper-lead alloys, which consists in applying to the bearing surfaces lubricant comprising mineral hydrocarbon oil normally tending to corrode said surfaces and having incorporated therein tin tetra phenyl in soluble proportions above about 0.03% by weight.

5. In the lubrication of bearing surfaces, at least one of which is formed of an alloy having substantially the corrosion susceptibility characterizing cadmium-silver, cadmium-nickel and copper-lead alloys, with mineral hydrocarbon oil normally tending to cause substantial and rapid corrosion thereof in service, the method of inhibiting such corrosion, which comprises incorporating with said oil tin tetra phenyl in soluble proportions above about 0.02% by weight.

PHILIP GORDON COLIN.
ARTHUR WALTHER LEWIS.